United States Patent
Oksman et al.

(10) Patent No.: US 6,754,318 B2
(45) Date of Patent: Jun. 22, 2004

(54) CONFIGURABLE MULTI-PORT MODEM TO ACHIEVE A HIGH BIT RATE IN A DSL SYSTEM

(75) Inventors: Vladimir Oksman, Morganville, NJ (US); Raphael Rahamim, Orange, CA (US)

(73) Assignee: Broadcom, Irvine, CA (US)

( * ) Notice: Subject to any disclaimer, the term of this patent is extended or adjusted under 35 U.S.C. 154(b) by 154 days.

(21) Appl. No.: 10/200,991

(22) Filed: Jul. 23, 2002

(65) Prior Publication Data

US 2004/0017902 A1 Jan. 29, 2004

(51) Int. Cl.$^7$ .............................................. H04M 11/00
(52) U.S. Cl. ..................................... 379/93.28; 375/222
(58) Field of Search ............................ 379/93.14, 93.08, 379/90.01, 93.28–93.34; 375/222, 219, 257; 709/226, 253, 250

(56) References Cited

U.S. PATENT DOCUMENTS

| | | | |
|---|---|---|---|
| 2001/0040917 A1 | * 11/2001 | Kumar et al. | 375/219 |
| 2002/0010779 A1 | * 1/2002 | Heller et al. | 709/226 |
| 2003/0074480 A1 | * 4/2003 | Kelliher | 709/253 |

* cited by examiner

*Primary Examiner*—Wing F Chan
(74) *Attorney, Agent, or Firm*—Timothy W. Markison (57) ABSTRACT

A configurable multi-port modem includes a plurality of hybrids, a plurality of receivers, a plurality of transmitters, and a switching module. Each of the plurality of hybrids is operably coupled to provide 2 to 4 wire coupling for a corresponding one of a plurality of twisted pairs that are coupled to the configurable multi-port modem. Each of the plurality of receivers is operably coupled to convert inbound DSL signals into inbound data. Each of the plurality of transmitters is operably coupled to convert outbound data into outbound DSL signals. The switching module is operable to couple at least one of the plurality of hybrids to at least one of the plurality of receivers and to at least one of the plurality of transmitters based on a configuration control signal.

20 Claims, 7 Drawing Sheets

FIG. 3
DSL system 10

FIG. 4
configurable modem 12 - 26

FIG. 5
example 1 of band usage

FIG. 6
example 2 of band usage

FIG. 7
example 3 of band usage

FIG. 8
configurable modem 12 - 26

FIG. 9

CONFIGURABLE MULTI-PORT MODEM TO ACHIEVE A HIGH BIT RATE IN A DSL SYSTEM

BACKGROUND OF THE INVENTION

1. Technical Field of the Invention

This invention relates generally to communication systems and more particularly to digital subscriber line (DSL) based communication systems.

2. Description of Related Art

Communication systems are known to enable a plurality of communication devices to communicate among themselves and with communication devices in other communication systems. Such communication devices, which may be computers, modems, facsimile machines, printers, personal digital assistants, et cetera, communicate voice, text, and/or video data. Such communication systems support the communication of data in accordance with one or more communication standards. As is known, there are a large number of communication standards for the communication of data and such standards vary from country to country. For example, there are a variety of standards governing digital subscriber line (DSL) communications and such standards vary from country to country.

Figures 1, 2:
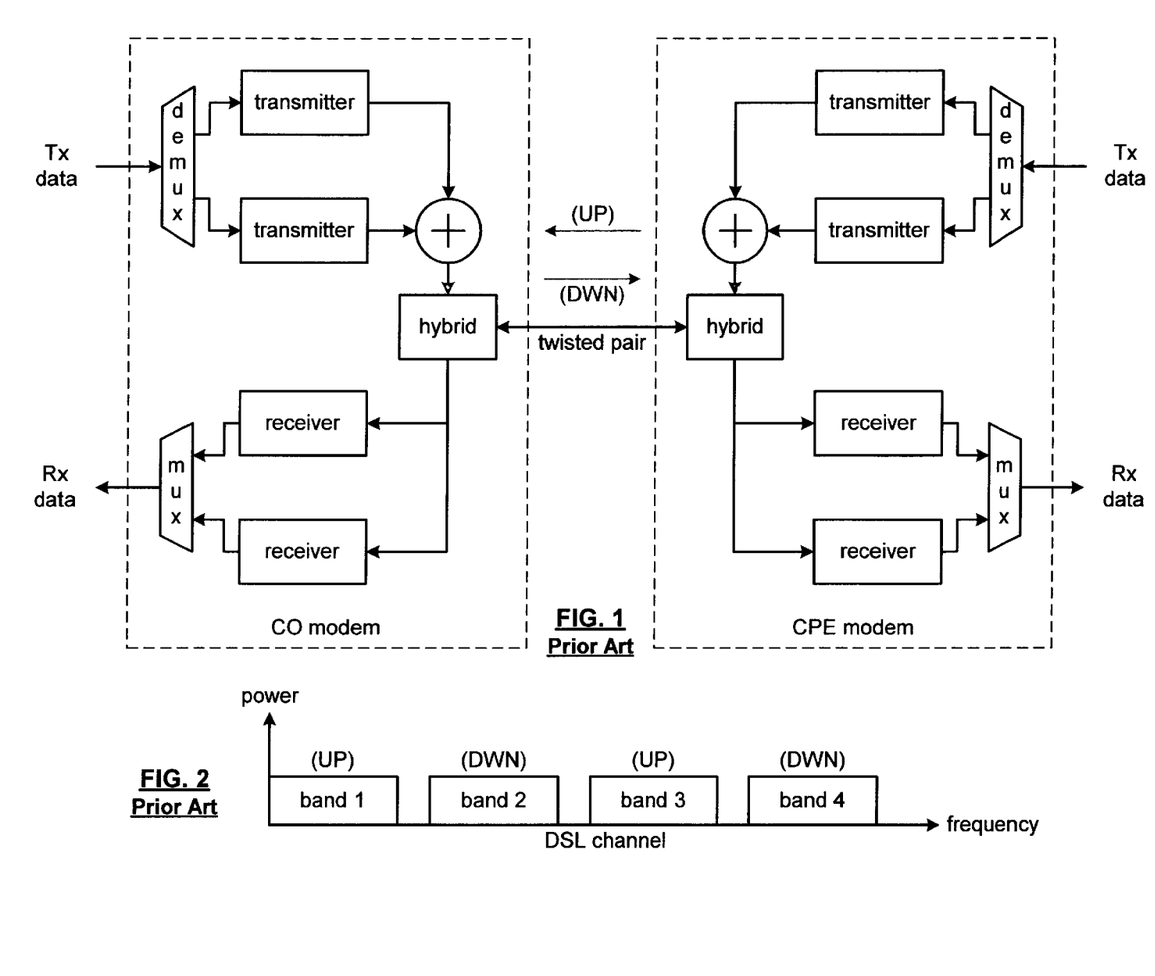
FIG. 1 is a schematic block diagram of prior art DSL modems.
FIG. 2 is a graphical representation of frequency band allocations of a DSL channel in accordance with one or more DSL communication standards.

As is further known, for a communication device to communicate via a DSL based system, the communication device includes a DSL modem. Typically, the location of the communication device with its associated DSL modem is referred to as the customer premises. The DSL modem at the customer premises is typically coupled via a twisted pair to a DSL modem at a central office. FIG. 1 illustrates an example of a DSL modem at the customer premise (CPE) coupled to a DSL modem at the central office (CO). The coupling is achieved via a twisted pair, which supports one DSL channel, and is one of a plurality of twisted pairs in a cable binder, or bundle of wires. In this example, the frequency allocation of the DSL channel is illustrated in FIG. 2.

As shown in FIG. 2, the DSL channel includes 4 frequency bands (band 1 through band 4). Each band may be allocated for upstream transmission (i.e., from the CPE to the CO) or downstream transmission (i.e., from the CO to the CPE). For example, bands 1 and 3 may be used for upstream transmissions while bands 2 and 4 are used for downstream transmissions. The width (i.e., frequency) and height (i.e., power) of each band may vary and are typically defined by one or more standards. For example, various DSL standards prescribe a frequency, or spectral, plan that define the transmit frequencies (i.e., start frequency and width) and associated powers (i.e., height) for each band. This is done primarily to minimize near-end-cross-talk between twisted pairs within a cable binder by having each twisted pair within a cable binder using the same frequency plan.

To support the DSL channel illustrated in FIG. 2, the CO modem and CPE modem of FIG. 1 each include two transmitters and two receivers. In addition, each modem includes a hybrid, which performs a 2-wire to 4-wire conversion, a summer, and a splitting multiplexer and a reconstruction multiplexer. Accordingly, for the example given where bands 1 and 3 are used for upstream data communications, the $1^{st}$ transmitter of the CPE modem transmits the data in band 1 and the $2^{nd}$ transmitter of the CPE modem transmits the data associated with band 3. The transmitters in the CO modem transmit the data in band 2 and data in band 4, respectively. Correspondingly, the receivers in the CPE modem receive the data in band 2 and band 4, respectively. Similarly, the receivers in the CO modem receive the data in band 1 and band 3, respectively. Alternatively, bands 1 and 3 may be used for downstream transmissions and bands 2 and 4 may be used for upstream transmissions.

The splitting multiplexers in the CO modem and CPE modem split the incoming transmit data between the respective transmitters. Conversely, the reconstructing multiplexers, reconstruct the data received from the respective receivers into a serial data stream.

When data can be allocated into all 4 bands, the CPE modem and CO modem are capable of transceiving data at a relatively high bit rate (e.g., greater than 5 Mbps). Typically, the shorter the twisted pair, the less cable loss and the less cross-talk the twisted pair, or loop, exhibits. Conversely, the cable loss and cross-talk increase as the length of the loop increases. When the cable loss and cross-talk increase to significant levels, the upper frequency bands (e.g., band 3 and band 4), become unusable. Thus, CPE modems coupled to the central office via shorter loops typically have higher bit rates than CPE modems coupled to the central office via longer loops. This creates a discontinuity in quality of service since some users have a higher bit rate than others.

Therefore, a need exists for a method and apparatus for a configurable modem that achieves high bit rates in a DSL system regardless of the loop length.

BRIEF SUMMARY OF THE INVENTION

The configurable multi-port modem of the present invention substantially meets these needs and others. An embodiment of a configurable multi-port modem includes a plurality of hybrids, a plurality of receivers, a plurality of transmitters, and a switching module. Each of the plurality of hybrids is operably coupled to provide 2 to 4 wire coupling for a corresponding one of a plurality of twisted pairs that are coupled to the configurable multi-port modem. For example, many homes and businesses have multiple lines, or twisted pairs, coming into their homes or offices. Accordingly, the configurable multi-port modem includes the plurality of hybrids to coupled to these multiple lines, or twisted pairs.

Each of the plurality of receivers is operably coupled to convert inbound DSL signals into inbound data. Each of the plurality of transmitters is operably coupled to convert outbound data into outbound DSL signals. The switching module is operable to couple at least one of the plurality of hybrids to at least one of the plurality of receivers and to at least one of the plurality of transmitters based on a configuration control signal. For example, when the loop is relatively short, a single twisted pair may be utilized to carry the DSL communication. In this instance, the plurality of receivers and plurality of transmitters would be coupled to a single hybrid, where each receiver and transmitter processing a different frequency band.

As the loop length increases and the usable frequency band decreases, additional lines, or twisted pairs may be used. As such, if two lines are being used, two hybrids are used and the plurality of receivers and transmitters, via the switching module, are configured to process one frequency band of one of the twisted pairs.

Another embodiment of a configurable multi-port modem includes a plurality of input/output modules, a plurality of transceivers, a plurality of hybrids, $1^{st}$ switching module, and $2^{nd}$ switching module. The $1^{st}$ switching module is operable to couple at least one of the plurality of input/output modules to at least one of the plurality of transceivers based on a configuration control signal. The $2^{nd}$ switching module is operable to couple at least one of the plurality of transceivers (i.e., transmitter/receiver) to at least one of the plurality of hybrids based on the configuration control signal.

In this embodiment, if the loop length is short and the high frequency bands are usable, the configurable multi-port modem may be configured to utilize the multiple twisted pairs to support multiple DSL communications. As the loop length increases, and the corresponding number of frequency bands per twisted pair decreases, the configurable multi-port modem can be configured to support a single DSL communication over the multiple twisted pairs using the same number of transceivers.

In any embodiment of a configurable multi-port modem in accordance with the present invention, more uniformed quality of service can be provided to customers regardless of loop length while maintaining adherence to frequency plans of various standards.

DETAILED DESCRIPTION OF THE INVENTION

Figure 3:
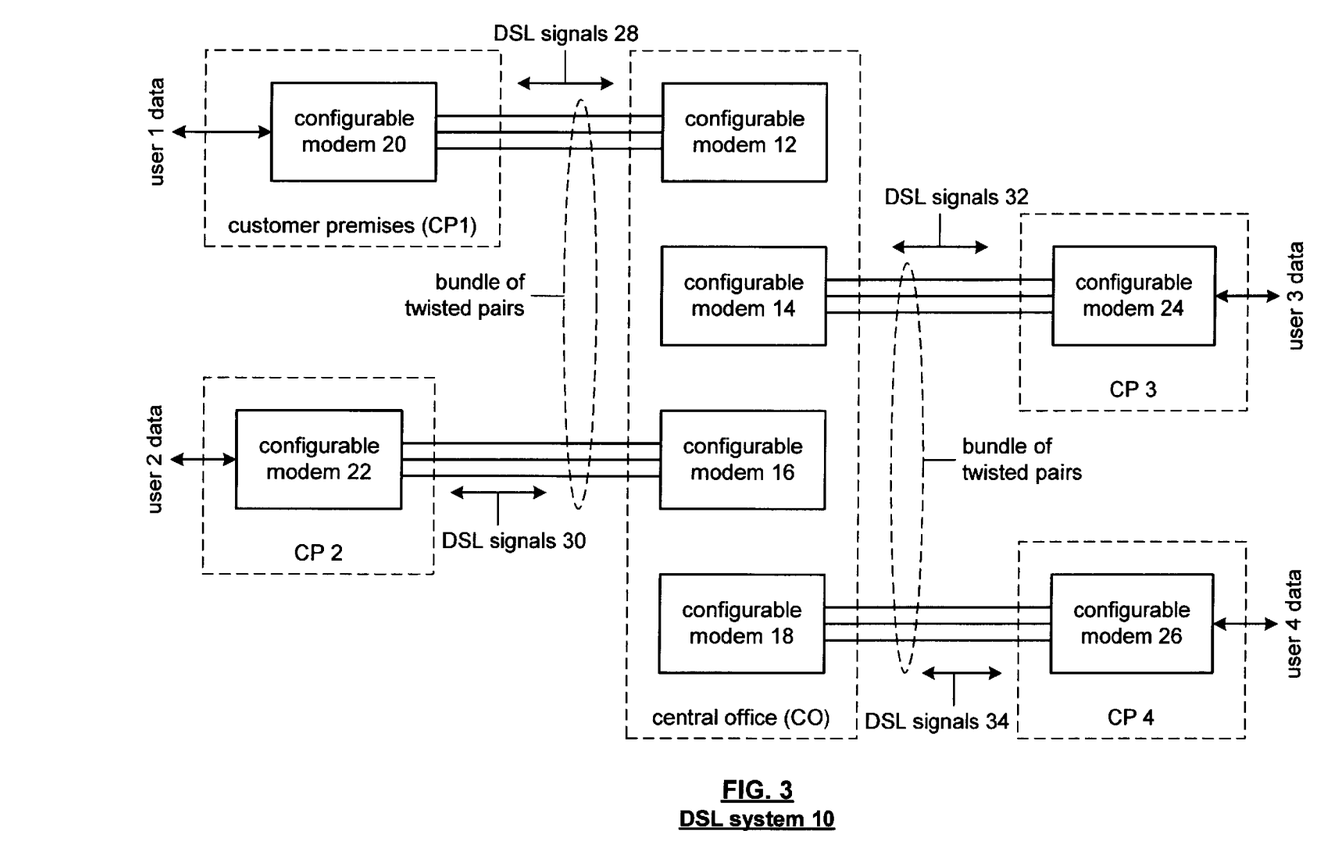
FIG. 3 is a schematic block diagram of a DSL system in accordance with the present invention.

FIG. 3 is a schematic block diagram of a DSL system 10 that includes a plurality of configurable modems 20–26 at various customer premises (CPE1–CPE4) and a central office (CO). The central office includes a plurality of configurable modems 12–18. Each configurable modem 12–18 of the central office is coupled via a plurality of twisted pairs with a configurable modem 20–26 at one of the customer premises CPE1–CPE4. The twisted pairs between the central office and the customer premises may be in one or more bundles of twisted pairs, or cable binders and may include two or more twisted pairs.

Each of the configurable modems 20–26 at the customer premises CPE1–CPE4 communicates DSL signals 28–34 with a corresponding configurable modem 12–18 within the central office. For example, configurable modem 20 processes user data 1 to communicate DSL signals 28 with configurable modem 12. Similarly, configurable modem 22 processes user data 2 to communicate DLS signals 30 with configurable modem 16. Configurable modem 24 processes user 3 data to communicate DSL signals 32 with configurable modem 14. Configurable modem 26 processes user 4 data to communicate DSL signals 34 with configurable modem 18.

The distance between the central office and each of the customer premises may range from a few hundred feet to several kilofeet. Accordingly, the customer premises that are closer to the central office have a shorter DSL loop than customer premises that are further away. However, by including the configurable modems 12–26, the same high bit rate of service may be provided to each customer premises regardless of the loop length. To achieve this, the configurable modems 20 may be implemented as shown in FIG. 4 and/or in FIG. 8.

Figure 4:
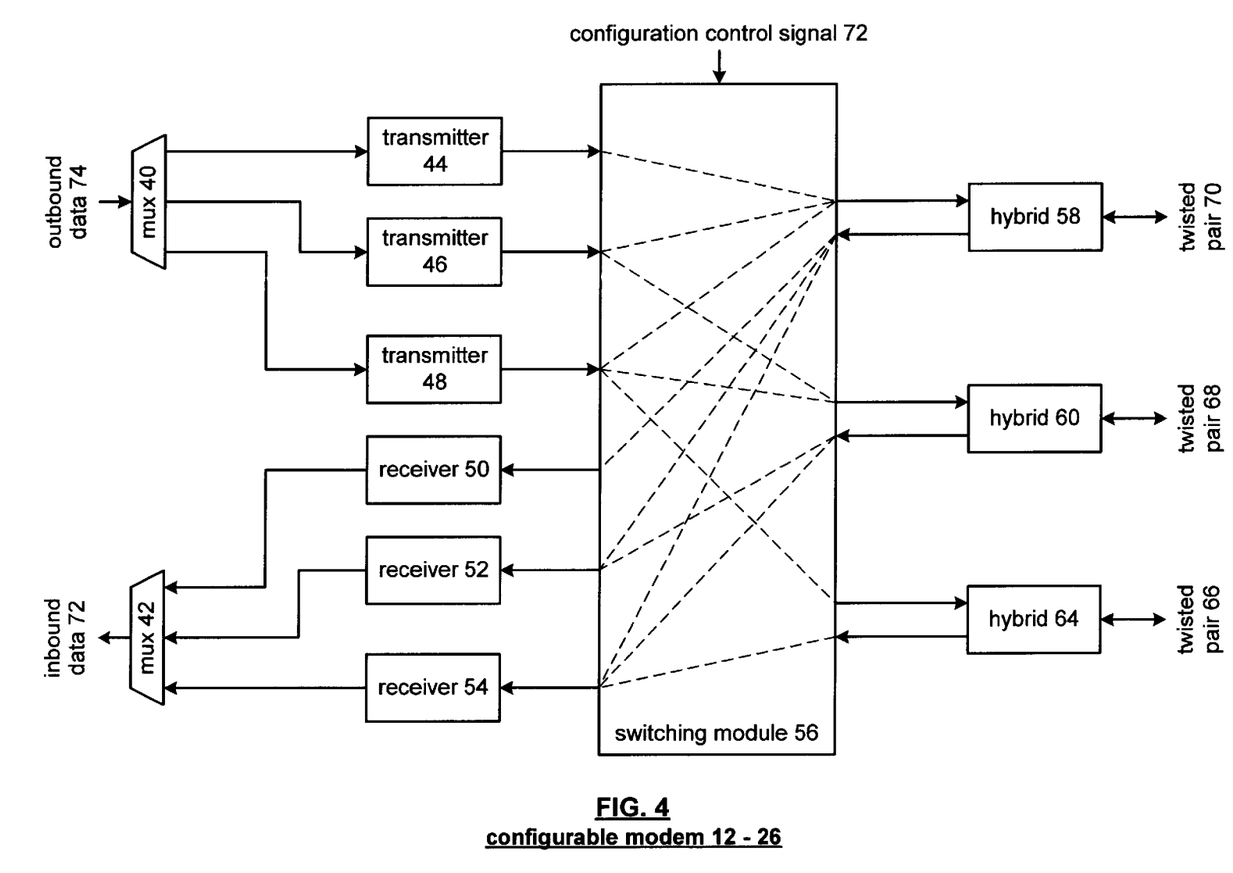
FIG. 4 is a schematic block diagram of a configurable modem in accordance with the present invention.

FIG. 4 is a schematic block diagram of a configurable modem 12–26 that includes multiplexers 40 and 42, a plurality of transmitters 44–48, a plurality of receivers 50–54, a switching module 56, and a plurality of hybrids 58–64. Each of the plurality of hybrids is coupled to a corresponding one of twisted pairs 66–70. The hybrids 58–64 perform a 2-wire to 4-wire conversion. As shown, the 2-wire connection is to the twisted pair and the 4-wire connection is to the switching module 56.

The switching module 56 couples one or more of the transmitters and receivers to individual hybrids based on a configuration control signal 72. For example, if the loop length is very short, all frequency bands of a DSL channel that includes multiple frequency bands are usable. As such, a single twisted pair may be used to support a DSL commmunication and provide a high bit rate. For example, hybrid 58 via twisted pair 70 may support the DSL channel having multiple frequency bands (e.g., six frequency bands). When this is the case, the switching module 56 couples each of the transmitters 44–48 to hybrid 58 and also couples each of the receivers 50–54 to the hybrid 58. With this configuration, each transmitter and each receive is allocated a frequency band.

Figure 5:
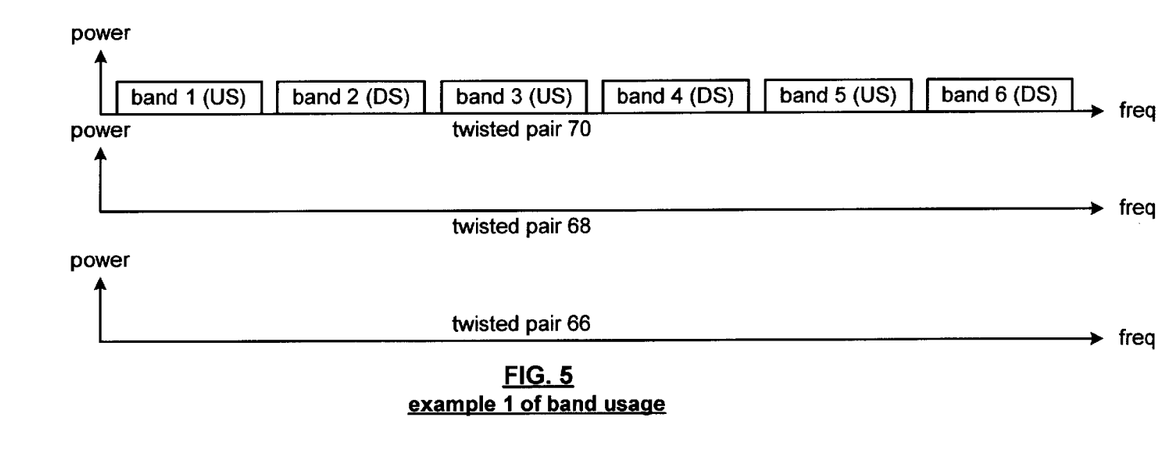
FIG. 5 is a graphical representation of an example of frequency band usage in the DSL system of FIG. 3.

For the example of short loop length and a six frequency band channel, FIG. 5 illustrates one possible allocation of the frequency bands. In this illustration, bands 1, 3, and 5 are allocated for upstream communications and bands 2, 4, and 6 are allocated for down stream communications. If the configurable multi-port modem is contained at a customer premises, transmitter 44 may be allocated to process frequency band 1; transmitter 46 may be allocated to process frequency band 3; and transmitter 48 may be allocated to process frequency band 5. Further, receiver 52 may be allocated to process frequency band 2; receiver 50 may be allocated to process frequency band 4; and receiver 54 may be allocated to process frequency band 6. In this example, twisted pairs 66 and 68 are unused.

Figure 6:
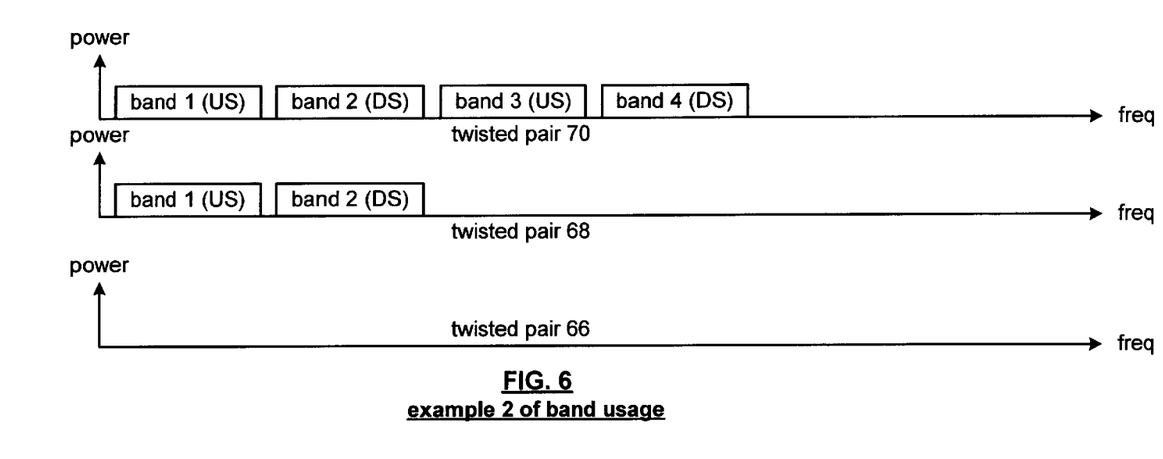
FIG. 6 is a graphical representation of a $2^{nd}$ example of frequency band usage in the DSL system of FIG. 3.

As the loop length increases, and the number of frequency bands decreases, the configuration control signal 72 may instruct the switching module 56 to use a pair of hybrids. This example is illustrated in FIG. 6 where the high frequency bands of twisted pair 70 are unusable due to the loop loss and/or cross-talk of twisted pair 70. As such, twisted pairs 68 and 70 are used to support a DSL communication. In this example, the switching module 56, based on the configuration control signal 72 would couple transmitters 44 and 46 to hybrid 58 and couple transmitter 48 to hybrid 60. In addition, the switching module 56 would couple receivers 50 and 52 to hybrid 58 and receiver 54 to hybrid 60.

Depending on whether the configuration modem is at the central office site or at a customer premises, the allocation of transmitter and receiver for upstream and downstream communications would vary. For example, if the modem were at a customer premise site, the transmitters 44 and 46 would be allocated to bands 1 and 3 of twisted pair 70. Receivers 50 and 52 would be allocated band 2 and band 4 of twisted pair 70. Transmitter 48, which is coupled to hybrid 60, would be allocated band 1 of twisted pair 68 and receiver 54 would be allocated band 2 of twisted pair 68.

Figure 7:
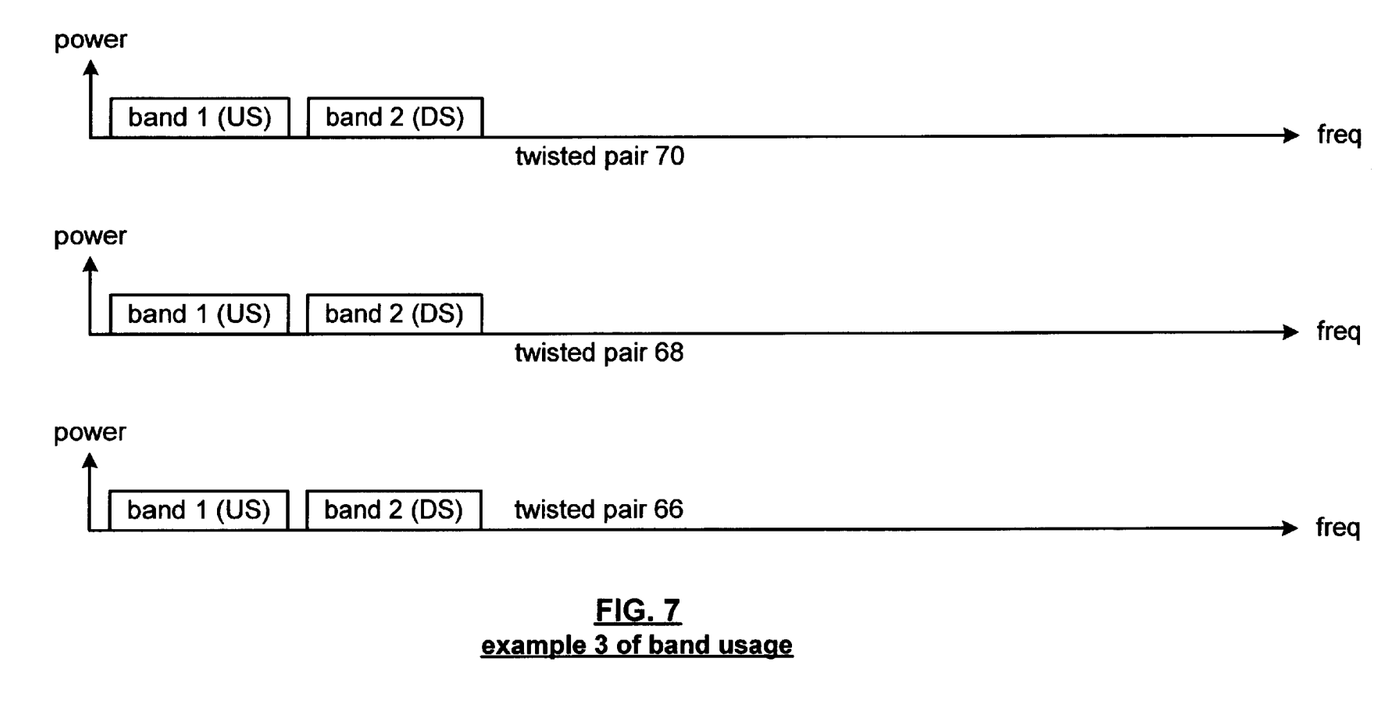
FIG. 7 is a graphical representation of a $3^{rd}$ example of frequency band usage in the DSL system of FIG. 3.

When the loop length between the customer premise and central office is of such a length where the losses only allow bands 1 and 2 to be used, the configuration control signal 72 causes switching module 56 to use each of the hybrid 58–64. Such an example is illustrated in FIG. 7 where each of the twisted pair 66–70 is used, but only bands 1 and 2 of the respective twisted pairs are used. Accordingly, if the configurable modem of FIG. 4 is at the customer premise, transmitter 44 and receiver 50 would be coupled to hybrid 58 and allocated bands 1 and 2 of twisted pair 70, respectively. Transmitter 46 and receiver 52 would be coupled to hybrid 60 and allocated bands 1 and 2 of twisted pair 68, respectively. Transmitter 48 and receiver 54 would be coupled to hybrid 64 and allocated bands 1 and 2 of twisted pair 66, respectively.

Accordingly, the bit rate supported by the configurable modem 12–26 can maintain a high rate by utilizing one or more twisted pairs as illustrated in examples 1–3 depicted in FIGS. 5–7. As one of average skill in the art will appreciate, more or less twisted pairs, hybrids, transmitters and receivers may be included in a configurable modem to achieve higher bit rates or lower bit rates than the bit rates achievable with the 3 sets illustrated in FIG. 4 and corresponding examples of FIGS. 5–7.

Returning to the discussion of FIG. 4, the configurable modem 12–26 also includes a splitting multiplexer 40, or demultiplexer, that splits outbound data 74 amongst the plurality of transmitters 44–48. The configurable modem 12–26 also includes a multiplexer 42 that combines the received data via receivers 50–52 and reconstructs a serial inbound data 72. The generation of the configuration control signal 72 will be described in greater detail with reference to FIGS. 8 and 9.

As one of average skill in the art will appreciate, the switching module 56 may be implemented using jumper wires, switches, or other manual coupling means. In these instances, the configurable control signal 72 is implicit in the coupling of the jumper wires and/or the configuring of the switches. As one of average skill in the art will further appreciate, the number of bands supported by a DSL channel may be more or less than the six discussed with reference to FIGS. 4–7. For example, in one embodiment, four bands may be used.

Figure 8:
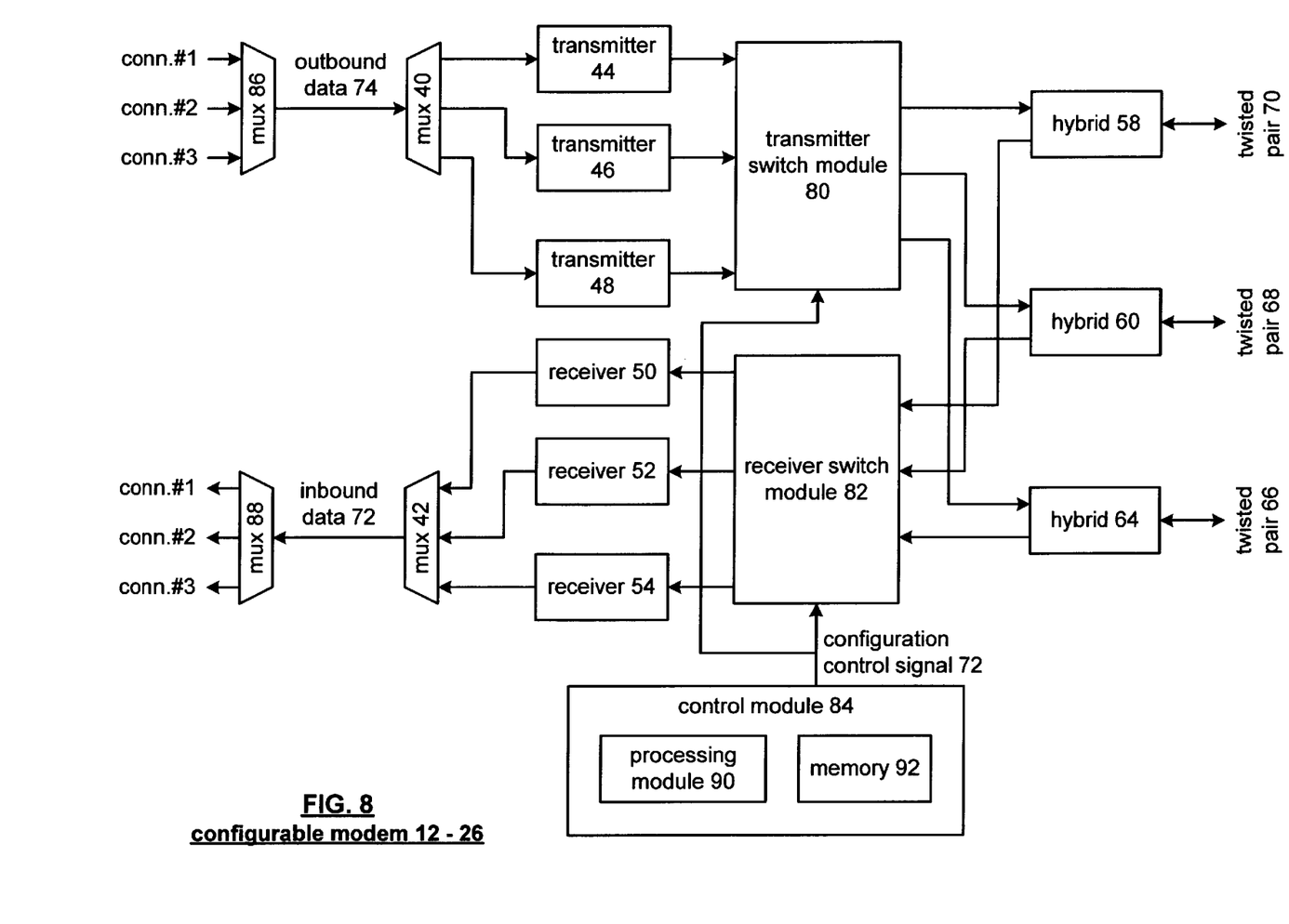
FIG. 8 is a schematic block diagram of an alternate configurable modem in accordance with the present invention.

FIG. 8 is a schematic block diagram of an alternate embodiment of the configurable modem 12–26. In this embodiment, the configurable modem includes combining multiplexer 86, splitting multiplexer 88, splitting multiplexer 40, combining multiplexer 42, a plurality of transmitters 44–48, a plurality of receivers 50–54, a transmit switch module 80, a receive switch module 82, a plurality of hybrids 58–64, and a control module 84. The control module 84, which may be included in the modem of FIG. 4, includes a processing module 90 and memory 92 to generate the configuration control signal 72. The processing module 90 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 92 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 90 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. The memory 92 stores, and the processing module 90 executes, operational instructions corresponding to at least some of the steps and/or functions illustrated in FIGS. 8 and 9.

The functionality of multiplexers 40 and 42, transmitters 44–48, receivers 50–54 and hybrids 58–64 operate as previously discussed with reference to FIG. 4. The transmitter switching module 80 and receiver switching module 82 provide selective coupling between hybrids 58–64 and transmitters 44–48 and receivers 50–54, respectively. Accordingly, the transmit switching module 80 and receiver switching module 82 may be a plurality of transistors, switches or combinations thereof that provide selective coupling between the transmitters 44–48 and hybrids 58–64 and receivers 50–54, respectively.

In this embodiment, the configurable modem may support multiple connections (three are shown, but more or less may be supported). A connection is a data communication by an in-office or in-home device that includes a configurable DSL modem with a configurable DSL modem at the central office. Accordingly, if the loop length between the DSL modem at the customer premises and central office is short, three connections may be supported. To support the three connections, each hybrid is coupled to a single receiver and a single transmitter or a set of receivers and a set of transmitters depending on the desired bit rate. Accordingly, to achieve the highest bit rate possible, each hybrid would be coupled to multiple receivers and transmitters to process multiple bands of the DSL channel. As such, for a six band DSL channel and three twisted pair modem, the modem may include up to nine transmitters and nine receivers to support the highest bit rate possible for each of three connections.

As the loop length increases and the higher frequency bands become unusable, the configurable modem 12–26 may be reconfigured to support 1 or 2 connections. When 1 connection is being supported, the configurable modem 12–26 functions similarly to the modem of FIG. 4 and the corresponding example illustrated in FIG. 7. When 2 connections are supported, the transmitters 44 and 46 and receivers 50 and 52 may be allocated to one of the two connections and transmitter 48 and receiver 54 may be allocated to the other of the two connections. Accordingly, the control module 84 determines the appropriate configuration and generates the configuration control signal 72 based thereon. Alternatively, the configuration control signal may be determined by measurements at the CPE and the switching module implemented via jumper wires and/or switches.

Figure 9:
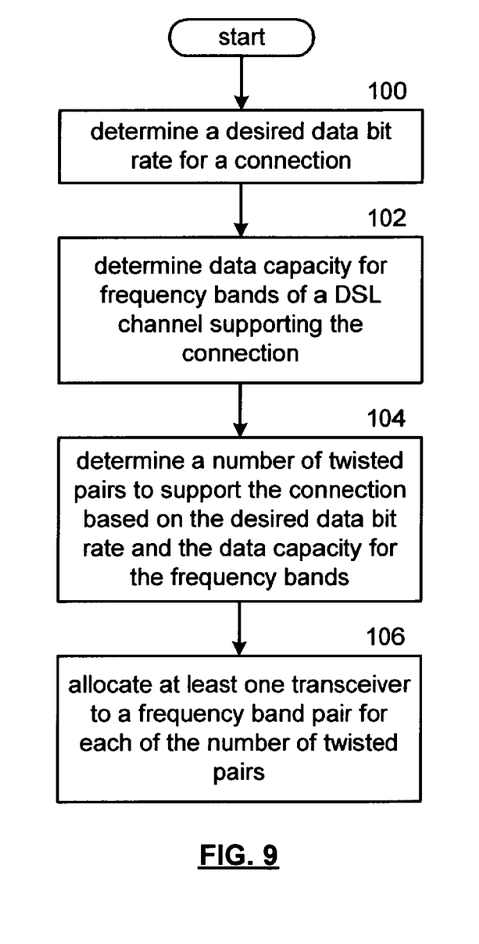
FIG. 9 is a logic diagram of a method for configuring a multi-port DSL modem in accordance with the present invention.

FIG. 9 is a logic diagram of a method for configuring a multi-port DSL modem in accordance with the present invention. The process begins at Step 100 where a desired data bit rate for a connection is determined. The data bit rate may range from a few hundred kilobits per second to tens of megabits per second. The process then proceeds to Step 102 where data capacity for frequency bands of a DSL channel supporting the connection are determined. Such a determination may be based on determining the loop length of the connection and based on the loop length establishing the data capacity. For a detailed discussion on determining loop length, refer to co-pending patent application entitled ADJUSTMENT OF TRANSMIT POWER BASED ON AN ESTIMATED ELECTRICAL LENGTH OF A LOOP, having a provisional filing date of May 31, 2002 and an attorney docket number of BP 2394. As previously mentioned, as the loop length increases, loop loss increases as does cross-talk. Thus, the greater the loop loss and cross-talk, the less usable the higher frequency bands are. Alternatively and/or in addition to loop length estimations, signal to noise ratio may be used to determine the data bit rate.

The process then proceeds to Step 104 where a number of twisted pairs to support the connection is determined based on the desired data bit rate and the data capacity for the frequency bands. This was graphically illustrated and described with reference to FIGS. 5–7. The process then proceeds to Step 106 where at least one transceiver (i.e., transmitter/receiver) is allocated to a frequency band pair (band 1 for upstream, band 2 for downstream) for each number of twisted pairs. Such an allocation may be done as graphically illustrated and described with reference to FIGS. 5–7.

The preceding discussion has presented a method and apparatus for configuring a multi-port DSL modem to achieve a high bit rate. Accordingly, such a configurable multi-port DSL modem provides the same quality of service, i.e., high bit rate, to each customer regardless of the loop length between the customer premise and the central office. As one of average skill in the art will appreciate, other embodiments may be derived from the teaching of the present invention, without deviating from the scope of the claims.

What is claimed is:

1. A configurable multi-port modem to achieve a high bit rate in a digital subscriber line (DSL) system, the multi-port configurable modem comprises:
    a plurality of hybrids operably coupled to provide two-to-four wire coupling to a plurality of twisted pairs;
    a plurality of receivers, wherein each of the plurality of receivers converts inbound DSL signals into inbound data;
    a plurality of transmitters, wherein each of the plurality of transmitters converts outbound data into outbound DSL signals; and
    switching module operable to couple at least one of the plurality of hybrids to at least one of the plurality of receivers and to at least one of the plurality of transmitters based on a configuration control signal to achieve the high bit rate.

2. The configurable multi-port modem of claim 1 further comprises:
    a control module operable to generate the configuration control signal based on a desired bit rate and loop length.

3. The configurable multi-port modem of claim 2, wherein the control module further functions to:
    generate the configuration control signal to couple the plurality of receivers and the plurality of transmitters to the plurality of hybrids in accordance with a frequency plan, wherein the frequency plan identifies frequency bands for upstream data and frequency bands for downstream data.

4. The configurable multi-port modem of claim 2, wherein the control module further functions to generate the configuration control signal to:
    couple a first receiver of the plurality of receivers to a first hybrid of the plurality of hybrids corresponding to a first band of a first one of the plurality of twisted pairs;
    couple a first transmitter of the plurality of transmitters to the first hybrid corresponding to a second band of the first one of the plurality of twisted pairs;
    couple a second receiver of the plurality of receivers to a second hybrid of the plurality of hybrids corresponding to the first band of a second one of the plurality of twisted pairs; and
    couple a second transmitter of the plurality of transmitters to the second hybrid corresponding to the second band of the second one of the plurality of twisted pairs.

5. The configurable multi-port modem of claim 1 further comprises:
    a transmit multiplexer operably coupled to provide a serial data stream of the outbound data to the plurality of transmitters; and
    a receiver multiplexer operably coupled to convert the inbound data from the plurality of receivers into an inbound serial data stream.

6. The configurable multi-port modem of claim 5 further comprises:
    inbound data multiplexer operably coupled to separate the inbound serial data stream into a plurality of inbound data streams; and
    outbound data multiplexer operably coupled to combine a plurality of output data streams into the serial data stream of the outbound data.

7. The configurable multi-port modem of claim 1, wherein the switching module further comprises:
    a receiver switching module operable to couple the at least one of the plurality of receivers to the at least one of the plurality of hybrids; and
    a transmitter switching module operable to couple the at least one of the plurality of transmitters to the at least one of the plurality of hybrids.

8. A configurable multi-port modem for use in a digital subscriber line (DSL) system, the configurable multi-port modem comprises:
    a plurality of transceivers operably coupled to convert received DSL inbound signals into inbound data and to convert outbound data into DSL outbound signals;
    a plurality of hybrids operably coupled to provide two-to-four wire coupling to a plurality of twisted pairs;
    first switching module operable to couple at least one of a plurality of connections to at least one of the plurality of transceivers based on a configuration control signal, wherein the at least one of the plurality of connections transceives the inbound and outbound data; and
    second switching module operable to couple the at least one of the plurality of transceivers to at least one of the plurality of hybrids based on the configuration control signal.

9. The configurable multi-port modem of claim 8 further comprises:
    a control module operable to generate the configuration control signal based on a desired bit rate and loop length.

10. The configurable multi-port modem of claim 9, wherein the control module further functions to:
generate the configuration control signal to couple the plurality of transceivers to the plurality of hybrids and to the plurality of input/output modules in accordance with a frequency plan, wherein the frequency plan identifies frequency bands for upstream data and frequency bands for downstream data.

11. The configurable multi-port modem of claim 9, wherein the control module further fictions to generate the configuration control signal to:
couple a first transceiver of the plurality of transceivers to a first hybrid of the plurality of hybrids corresponding to a first band and a second of a first one of the plurality of twisted pairs;
couple the first transceiver to a first one of the plurality of input/output modules to transceive a portion the inbound and outbound data of a single connection;
couple a second transceiver of the plurality of transceivers to a second hybrid of the plurality of hybrids corresponding to the first band and the second band of a second one of the plurality of twisted pairs; and
couple the second transceiver to a second one of the plurality of input/output modules to transceive a second portion of the inbound and outbound data of the single connection.

12. The configurable multi-port modem of claim 9, wherein the control module further functions to generate the configuration control signal to:
couple a first transceiver of the plurality of transceivers to a first hybrid of the plurality of hybrids corresponding to a first one of the plurality of twisted pairs;
couple the first transceiver to a first one of the plurality of input/output modules to transceive the inbound and outbound data of a first connection;
couple a second transceiver of the plurality of transceivers to a second hybrid of the plurality of hybrids corresponding to a second one of the plurality of twisted pairs; and
couple the second transceiver to a second one of the plurality of input/output modules to transceive the inbound and outbound data of the second connection.

13. A method for configuring a multi-port digital subscriber line (DSL) modem, the method comprises:
determining a desired data bit rate for a connection;
determining data capacity for frequency bands of a DSL channel supporting the connection;
determining a number of twisted pairs to support the connection based on the desired data bit rate and the data capacity for the frequency bands; and
allocating at least one transceiver to a frequency band pair for each of the number of twisted pairs.

14. The method of claim 13, wherein the determining the data capacity further comprises:
determining loop length for the connection; and
establishing the data capacity based on the loop length.

15. The method of claim 13, wherein the allocating the at least one transceiver further comprises, when the number of twisted pairs is one:
allocating a receiver to a first frequency band of the frequency band pair; and
allocating a transmitter to a second frequency band of the frequency band pair.

16. The method of claim 13, wherein the allocating the at least one transceiver further comprises, when the number of twisted pairs is greater than one:
allocating a first receiver to a first frequency band of a first twisted pair;
allocating a first transmitter to a second frequency band of the first twisted pair;
allocating a second receiver to the first frequency band of a second twisted pair; and
allocating a second transmitter to the second frequency band of the second twisted pair.

17. An apparatus for configuring a multi-port digital subscriber line (DSL) modem, the apparatus comprises:
processing module; and
memory operably coupled to the processing module, wherein the memory includes operational instructions that cause the processing module to:
determine a desired data bit rate for a connection;
determine data capacity for frequency bands of a DSL channel supporting the connection;
determine a number of twisted pairs to support the connection based on the desired data bit rate and the data capacity for the frequency bands; and
allocate at least one transceiver to a frequency band pair for each of the number of twisted pairs.

18. The apparatus of claim 17, wherein the memory further comprises operational instructions that cause the processing module to determine the data capacity by:
determining loop length for the connection; and
establishing the data capacity based on the loop length.

19. The apparatus of claim 17, wherein the memory further comprises operational instructions that cause the processing module to allocate the at least one transceiver by, when the number of twisted pairs is one:
allocating a receiver to a first frequency band of the frequency band pair; and
allocating a transmitter to a second frequency band of the frequency band pair.

20. The apparatus of claim 17, wherein the memory further comprises operational instructions that cause the processing module to allocate the at least one transceiver by, when the number of twisted pairs is greater than one:
allocating a first receiver to a first frequency band of a first twisted pair;
allocating a first transmitter to a second frequency band of the first twisted pair;
allocating a second receiver to the first frequency band of a second twisted pair; and
allocating a second transmitter to the second frequency band of the second twisted pair.

* * * * *